US011334742B2

(12) United States Patent
Tao et al.

(10) Patent No.: US 11,334,742 B2
(45) Date of Patent: May 17, 2022

(54) FINGERPRINT IDENTIFICATION METHOD AND APPARATUS, ELECTRONIC DEVICE, AND COMPUTER-READABLE STORAGE MEDIUM

(71) Applicants: Beijing BOE Optoelectronics Technology Co., Ltd., Beijing (CN); BOE Technology Group Co., Ltd., Beijing (CN)

(72) Inventors: Jingfu Tao, Beijing (CN); Pengfei Cheng, Beijing (CN); Lu Yu, Beijing (CN); Jian Sang, Beijing (CN); Kangle Chang, Beijing (CN)

(73) Assignees: BEIJING BOE OPTOELECTRONICS TECHNOLOGY CO., LTD., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 16/914,656

(22) Filed: Jun. 29, 2020

(65) Prior Publication Data
US 2021/0286965 A1 Sep. 16, 2021

(30) Foreign Application Priority Data
Dec. 18, 2019 (CN) .......................... 201911312539.X (51) Int. Cl.
G06K 9/00 (2006.01)
G06F 3/041 (2006.01)
G02F 1/1333 (2006.01)
G02F 1/13357 (2006.01)

(52) U.S. Cl.
CPC .......... G06K 9/0004 (2013.01); G06F 3/041 (2013.01); G06K 9/00087 (2013.01); G02F 1/13338 (2013.01); G02F 1/133603 (2013.01)

(58) Field of Classification Search
CPC .. G06K 9/0004; G06K 9/00087; G06F 3/041; G02F 1/13338; G02F 1/133603
See application file for complete search history.

(56) References Cited

U.S. PATENT DOCUMENTS

2016/0266695 A1* 9/2016 Bae ..................... G06F 3/04166
2019/0042825 A1* 2/2019 He ........................ G06K 9/0004
2019/0205605 A1* 7/2019 Kim ..................... G06K 9/0004
2019/0346594 A1* 11/2019 Zhang ............... G02F 1/133605
2020/0074142 A1* 3/2020 Yang .................. G06K 9/00087

* cited by examiner

Primary Examiner — Stephen G Sherman
(74) Attorney, Agent, or Firm — Westman, Champlin & Koehler, P.A.

(57) ABSTRACT

The present disclosure discloses a fingerprint identification method and apparatus, an electronic device, and a computer-readable storage medium. The fingerprint identification method includes: acquiring a touch position of an object on a display panel comprising a backlight module having a plurality of light emitting elements arranged into an array, in response to the object on the display panel; lighting at least one of the plurality of light emitting elements according to the touch position; collecting fingerprint information from the display panel, wherein the fingerprint information is obtained based on light which is emitted by the at least one lit light emitting element and is reflected by the object; and performing fingerprint identification according to the fingerprint information.

13 Claims, 9 Drawing Sheets

Sectional Position of Sensor Unit

Fig. 12

FINGERPRINT IDENTIFICATION METHOD AND APPARATUS, ELECTRONIC DEVICE, AND COMPUTER-READABLE STORAGE MEDIUM

CROSS-REFERENCE TO RELATED APPLICATION(S)

This application claims priority to the Chinese Patent Application No. 201911312539.X, filed on Dec. 18, 2019, which is incorporated herein by reference in its entirety.

TECHNICAL FIELD

The present disclosure relates to the field of fingerprint identification technology, and more particularly, to a fingerprint identification method and apparatus, an electronic device, and a computer-readable storage medium.

BACKGROUND

In recent years, application fields for fingerprints have become more and more extensive, and there are more and more identification methods for the fingerprints. However, when fingerprint identification is performed using light, a crosstalk distance between fingerprints is not taken into consideration, which leads to a poor anti-crosstalk effect. For example, when the crosstalk distance between the fingerprints is about 50 µm, the fingerprint information may be weak or even disappear, which may have an adverse effect on the fingerprint identification.

SUMMARY

The embodiments of the present disclosure provide a fingerprint identification method, the method comprising:

acquiring a touch position of an object on a display panel comprising a backlight module having a plurality of light emitting elements arranged into an array, in response to the object on the display panel;

lighting at least one of the plurality of light emitting elements according to the touch position;

collecting fingerprint information from the display panel, wherein the fingerprint information is obtained based on light which is emitted by the at least one lit light emitting element and is reflected by the object; and performing fingerprint identification according to the fingerprint information.

In an example, the touch position of the object on the display panel is a position of the object in a touch layer of the display panel, and lighting at least one of the plurality of light emitting elements according to the touch position comprises:

converting the position of the object in the touch layer into a position of the object in the backlight module;

determining at least one of the plurality of light emitting elements as the light emitting element to be lit according to the position of the object in the backlight module; and lighting the light emitting element to be lit.

In an example, determining at least one of the plurality of light emitting elements as the light emitting element to be lit according to the position of the object in the backlight module comprises: determining one or more of the plurality of light emitting elements at a preset distance from the position of the object in the backlight module as the light emitting element to be lit.

In an example, determining at least one of the plurality of light emitting elements as the light emitting element to be lit according to the position of the object in the backlight module comprises: determining N light emitting elements of the plurality of light emitting elements at the preset distance from the position of the object in the backlight module as the light emitting elements to be lit, wherein a distance between any two of the N light emitting elements is less than or equal to a preset value, and N is an integer greater than 1.

In an example, the preset distance depends on a distance between the backlight module and a surface of the display panel touched by the object and distances between respective ones of the plurality of light emitting elements of the backlight module.

In an example, the preset distance between the light emitting element to be lit and the position of the object in the backlight module is calculated according to the following equation:

$$n = \mathrm{Int}(H/(K^* \tan \theta)),$$

where n represents the preset distance by number of light emitting elements, H represents a distance between the backlight module and a surface of the display panel touched by the object P, θ represents a desired angular at which light is emitted from the light emitting element to the object, K represents a distance between two adjacent ones of the plurality of light emitting elements, and Int(x) represent a function for converting a number x into an integer.

The embodiments of the present disclosure further provide a computer-readable storage medium having stored thereon a computer program which, when executed by a processor, implements the fingerprint identification method as described above.

The embodiments of the present disclosure further provide a fingerprint identification apparatus, comprising a memory and a processor, wherein the memory has instructions stored therein, and the processor is configured to execute the instructions to:

acquire a touch position of an object on a display panel comprising a backlight module having a plurality of light emitting elements arranged into an array, in response to the object on the display panel;

light at least one of the plurality of light emitting elements according to the touch position;

collect fingerprint information from the display panel, wherein the fingerprint information is obtained based on light which is emitted by the at least one lit light emitting element and is reflected by the object; and perform fingerprint identification according to the fingerprint information.

In an example, the touch position of the object on the display panel is a position of the object in a touch layer of the display panel, and the processor is further configured to:

convert the position of the object in the touch layer into a position of the object in the backlight module;

determine at least one of the plurality of light emitting elements as the light emitting element to be lit according to the position of the object in the backlight module; and light the light emitting element to be lit.

In an example, the processor is further configured to: determine one or more of the plurality of light emitting elements at a preset distance from the position of the object in the backlight module as the light emitting element to be lit.

In an example, the processor is further configured to: determine N light emitting elements of the plurality of light emitting elements at the preset distance from the position of the object in the backlight module as the light emitting elements to be lit, wherein a distance between any two of the N light emitting elements is less than or equal to a preset value, and N is an integer greater than 1.

In an example, the preset distance depends on a distance between the backlight module and a surface of the display panel touched by the object and distances between respective ones of the plurality of light emitting elements of the backlight module.

The embodiments of the present disclosure further provide nn electronic device, comprising:

a display panel comprising a backlight module having a plurality of light emitting elements provided therein, wherein the plurality of light emitting elements are arranged into an array; and the fingerprint identification apparatus according to claim 8.

In an example, the display panel further comprises a plurality of sensor units provided on a light exit side of the backlight module, and are configured to provide fingerprint information based on light which is emitted by the at least one lit light emitting element and is reflected by the object touching the display panel.

In an example, the display panel further comprises:
a color filter layer having the plurality of sensor units provided therein; and
a display substrate provided between the backlight module and the color filter layer and having a touch layer for providing the touch position of the object provided therein.

In an example, the display panel further comprises:
a cover provided on one side of the color filter layer away from the backlight module; and
an optical clear adhesive provided between the cover and the color filter layer.

In an example, the plurality of light emitting elements are mini-Light Emitting Diodes.

In an example, the plurality of light emitting elements are micro-Light Emitting Diodes.

In an example, the display panel is a full-screen display panel.

DETAILED DESCRIPTION

The embodiments of the present disclosure will be described in detail below, and examples of the embodiments are shown in the accompanying drawings, throughout which the same or similar reference signs indicate the same or similar elements or elements having the same or similar functions. The embodiments described below with reference to the accompanying drawings are exemplary and are intended to explain the present disclosure, but should not be construed as limiting the present disclosure.

The fingerprint identification method and apparatus, the electronic device, and the computer-readable storage medium according to the embodiments of the present disclosure will described below with reference to the accompanying drawings.

Figure 1A:
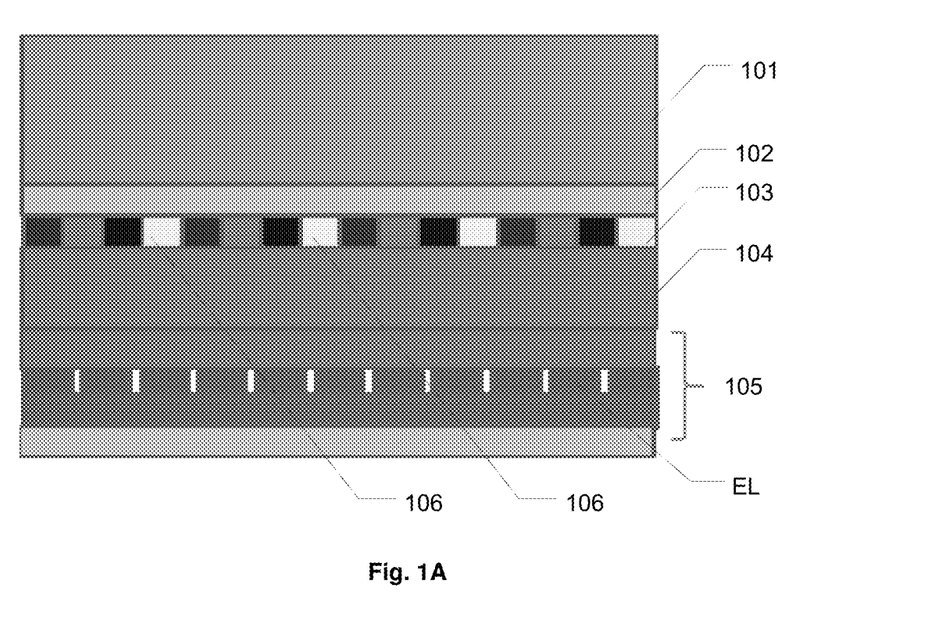
FIG. 1A is a schematic structural diagram of a display panel according to an embodiment of the present disclosure.

FIG. 1A is a schematic structural diagram of a display panel according to an embodiment of the present disclosure. It should be illustrated that, in the embodiment of the present disclosure, the fingerprint identification method may be implemented by using the display panel shown in FIG. 1A.

As shown in FIG. 1A, the display panel comprises a cover 101, an Optical Clear Adhesive (OCA) 102, a Color Filter (CF) layer 103, a display substrate 104 and a BackLight Unit (BLU) 105.

The cover 101 may be a cover glass with a thickness between 0.5 mm and 0.8 mm, a material of the cover 101 may be a material with high transmittance and high uniformity, and the cover 101 is used to protect the entire display screen.

A thickness of the OCA 102 may be between 0.05 mm and 0.1 mm, and a material of the OCA 102 is a colloid with high transmittance.

The display panel may further comprise a plurality of sensor units 106, for example, optical sensor units. The plurality of sensor units 106 may be provided on a light exit side of the backlight module 105. In FIG. 1A, the sensor units 106 may be provided in the CF layer 103. In some embodiments, the sensor units 106 may be provided on an upper surface (a side facing the cover 101) or a lower surface (a side facing the substrate) of the CF layer 103. In some embodiments, the sensor units 106 may be provided on a lower surface (a side away from the CF layer 103) of the display substrate 104.

The display substrate 104 is provided between the backlight module 105 and the CF layer 103. The display substrate 104 is used to realize a function of controlling transmittance of light and a touch function. The display substrate 104 may have a touch layer provided therein, wherein the touch layer is used to determine a touch position of an object (for example, a finger). The display substrate 104 may include a plurality of light emitting elements (also referred as point light sources herein) arranged into an array. The plurality of light emitting elements can be controlled independently from each other. The display substrate 104 may be a Liquid Crystal Display (LCD) display substrate, and the plurality of point light sources in the backlight module 105 are used to provide backlight to the LCD display substrate. Of course, the embodiments of the present disclosure are not limited thereto, and the display substrate 104 may be a display substrate based on LED display technology, and the plurality of point light sources in the backlight module 105 may act as light emitting units of the display substrate.

In some embodiments, the display panel (also referred to herein as a display screen) may be a full-screen display panel.

Figure 1B:
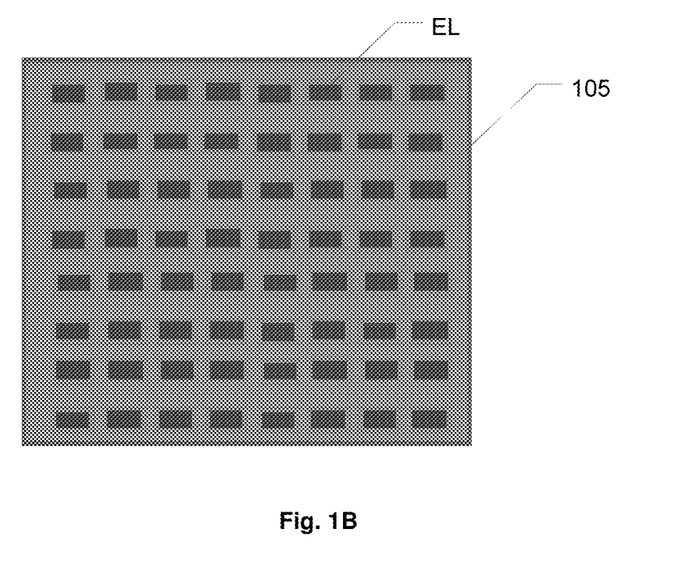
FIG. 1B is a schematic plan view of a backlight module of a display screen according to an embodiment of the present disclosure.

FIG. 1B is a schematic plan view of a backlight module of a display screen according to an embodiment of the present disclosure. As shown in FIG. 1B, the backlight module 105 comprises a plurality of point light sources EL, which may be arranged in an array. The point light sources EL may be mini-Light emitting Diodes (LEDs) or a micro-LEDs, and the backlight module 105 is used to provide incident light sources. Light emitted by lit point light sources EL in the backlight module 105 is reflected by an object (for example, a finger) touching a display panel, the reflected light may be received by one or more of a plurality of sensor units 106, and the one or more sensor units 106 may provide fingerprint information based on the received reflected light. The sensor units 106 may operate on light having a wavelength in a range of 380 nm to 780 nm.

Figure 2:
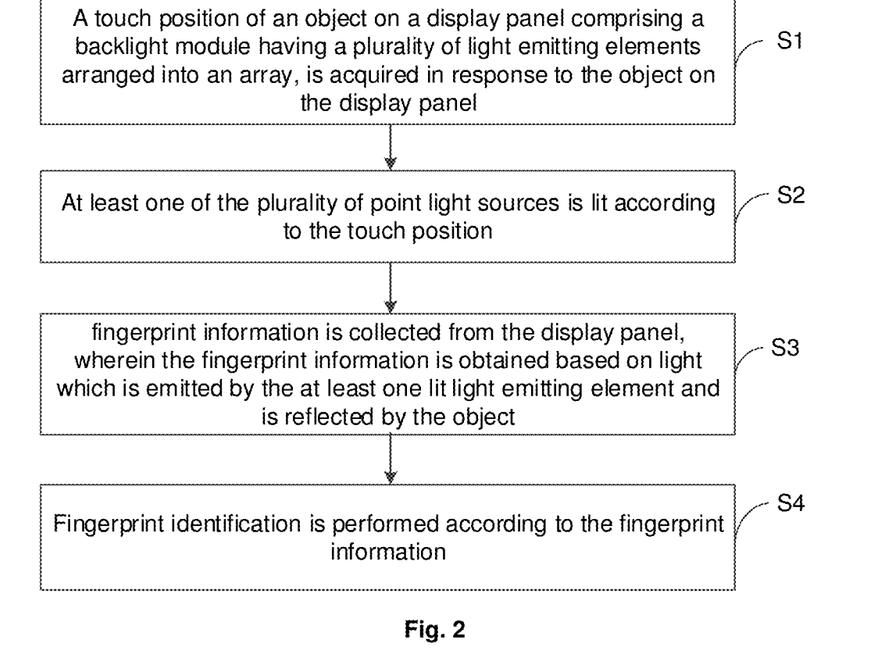
FIG. 2 is a flowchart of a fingerprint identification method according to an embodiment of the present disclosure.

FIG. 2 is a flowchart of a fingerprint identification method according to an embodiment of the present disclosure.

As shown in FIG. 2, the fingerprint identification method comprises steps S1 to S5.

In step S1, a touch position of an object on a display panel comprising a backlight module having a plurality of light emitting elements arranged into an array, is acquired in response to the object on the display panel.

For example, when an object is identified on a full screen, for example, when a finger touches the full screen, a touch layer of the full screen may provide coordinate information of the object on the display panel. A plurality of touch sensors arranged in an array may be provided in the touch layer, and each of the touch sensors may generate a touch signal in response to the touch by the object, and a position coordinate of the finger may be obtained based on touch signals from the respective sensors. According to a number of fingers touching the display panel, the position coordinate of the finger may be a position coordinate of one finger or may also be position coordinates of multiple fingers.

In step S2, at least one of the plurality of point light sources is lit according to the touch position.

Figure 3A:
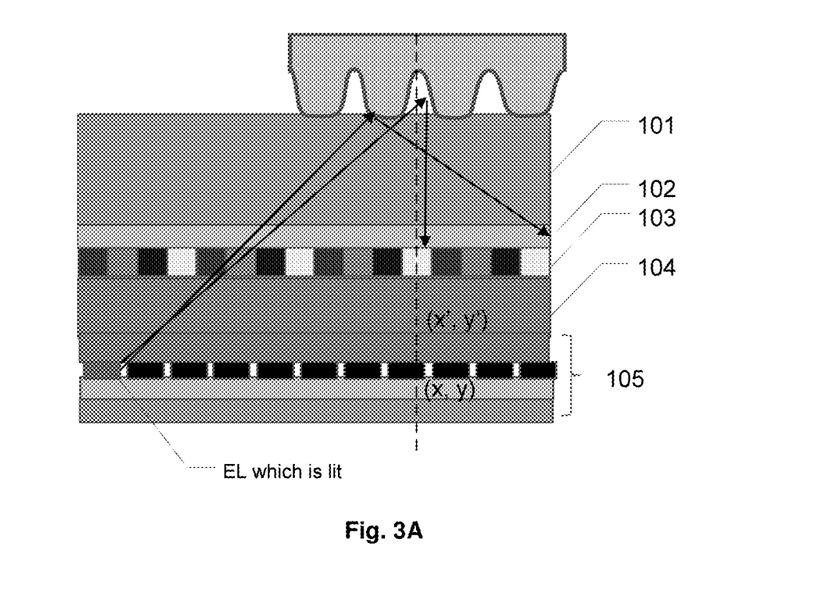
FIGS. 3A and 3B are schematic diagrams of fingerprint collection according to an embodiment of the present disclosure.
Figure 3B:
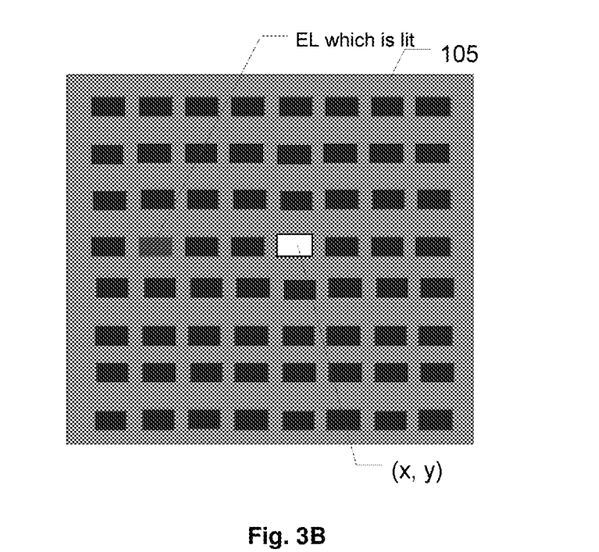

As shown in FIG. 3A, the touch position of the object (for example, a finger) on the display panel may be a position (x', y') of the object in the touch layer of the display panel (which is located in the display substrate 104), wherein the position coordinate (x', y') correspond to a touch sensor in an x' row and a y' column of a touch sensor array of the touch layer. In this step, the position (x', y') of the object in the touch layer may be converted into a position (x, y) of the object in the backlight module 105, wherein the position coordinate (x, y) represents a point light source EL in an x row and a y column of a point light source array. At least one of the plurality of point light sources EL may be determined as the point light source to be lit according to the position of the object in the backlight module 105, and the point light source to be lit may be lit. For example, one or more point light sources at a preset distance from the position of the finger in the backlight module may be determined as the point light source to be lit.

Figure 4A:
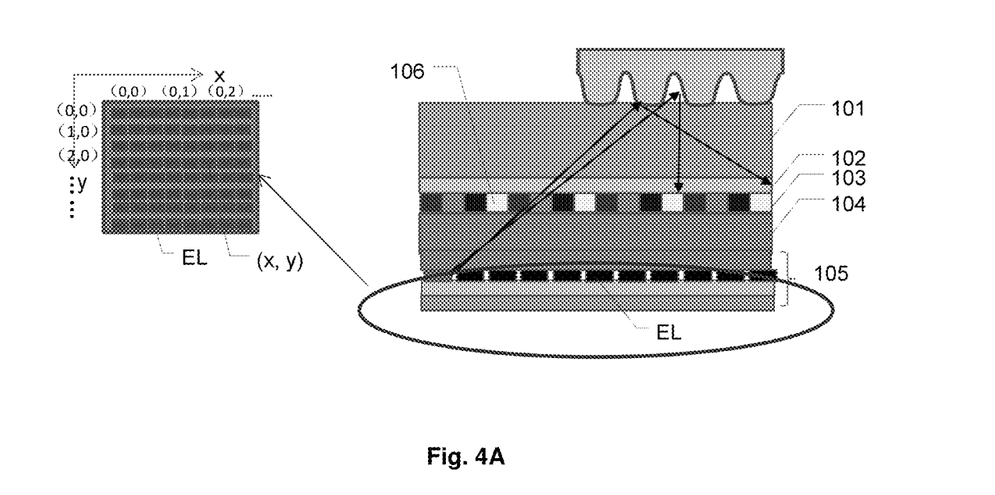
FIG. 4A is a schematic diagram of coordinates of point light sources according to an embodiment of the present disclosure.
Figure 4B:
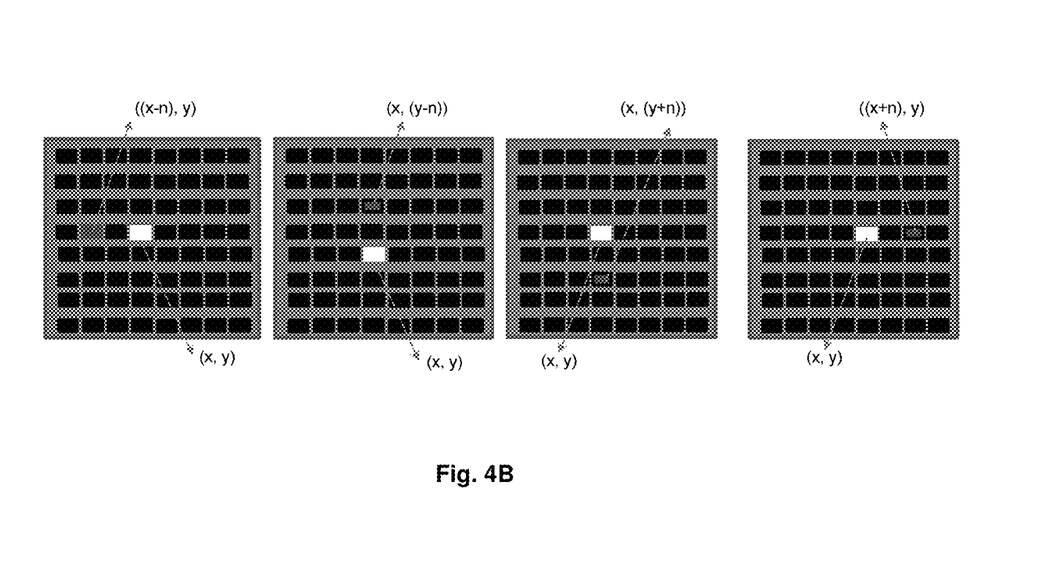
FIG. 4B is a schematic diagram of coordinates of point light sources which need to be lit according to an embodiment of the present disclosure.
Figure 4C:
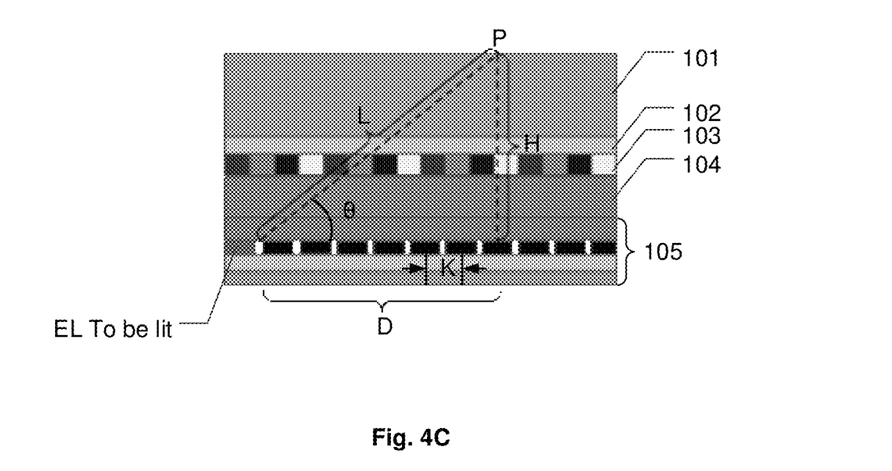
FIG. 4C is a schematic diagram showing a principle of calculating the distance of the light emitting element to be lit from the touch position.

In an embodiment of the present disclosure, as shown in FIG. 4C, the preset distance D between the light emitting element EL to be lit and the position of the object in the backlight module 105 may be calculated according to the following equation:

$$D = H/\tan\theta,$$

where D represents the preset distance in length, H represents a distance between the backlight module 105 and a surface of the display panel touched by the object P (which is a surface on a side of the cover 101 away from the backlight module 105), and θ represents a desired angular at which light is emitted from the light emitting element EL to the object P. A distance L between the object P and the light emitting element EL is equal to H/sin θ.

the preset distance in length D may be converted to number n of light emitting elements EL according to the following equation:

$$n = \text{Int}(D/K)$$
$$= \text{Int}(H/(K^*\tan\theta))$$

where K represents the distance between two adjacent light emitting elements EL, i.e. pitch of the light emitting elements, Int(x) represent a function for converting a number x into an integer. For example, if H/(K*tan θ)=3.05, Int(H/(K*tan θ))=3, i.e. n=3.

For example, according to the acquired coordinate information, one or more point light sources EL, which is located in an area of the backlight module 105 below a side of the object (finger) and has a certain distance, for example, 1 mm, from the object, may be determined as the point light source to be lit, wherein the side lower area is also referred to as a fingerprint identification area. Here, as shown in FIGS. 4A and 4B, the side lower area may be a front area, a rear area, a left area, or a right area with respect to the coordinate (x, y) of the finger, that is, an area adjacent to the coordinate (x, y).

As shown in FIG. 4A, a position of each point light source EL in the backlight module 105 in the point light source array may be numbered with ordinate and abscissa, for example, (0,1), (1,0), etc., so that each point light source EL correspond to one coordinate. As shown in FIG. 4B, one or more point light sources in the backlight module 105 corresponding to the fingerprint identification area, for example, point light sources in the front area, the rear area, the left area, or the right area with respect to the coordinate (x, y), may be lit, and coordinates of the point light sources in the four areas may be expressed as (x, (y+n)), (x, (y−n)), ((x−n), y), and ((x+n), y) respectively. Here, a value of n may depend on a distance between the backlight module 105 and a surface of the display panel touched by the finger (which is a surface on a side of the cover 101 away from the backlight module 105) and distances between the respective point light sources. In theory, the larger the value of n, the better the effect of the fingerprint identification, but since the value of n is limited by an energy loss, the value of n is selected through determination according to practical conditions.

In step S3, fingerprint information is collected from the display panel, wherein the fingerprint information is obtained based on light which is emitted by the at least one lit light emitting element and is reflected by the object.

For example, as shown in FIGS. 3A and 4A, after the point light source is lit according to the above steps, light emitted by the point light source EL is obliquely incident on a surface of the finger (comprising valleys and ridges of the fingerprint) at a certain angle, and a part of the light may be reflected by the finger to the sensor units 106, so that the sensor units 106 generate fingerprint information. Thereby, the light reflected by the fingerprint passes through the cover 101 to realize collection of the fingerprint information.

In step S4, fingerprint identification is performed according to the fingerprint information.

For example, the sensor units 106 may output different electrical signals according to illuminance of light reflected by the valleys and illuminance of light reflected by the ridges during one fingerprint period, wherein the electrical signals carry valley-to-ridge contrast information. Therefore, the electrical signals output by the sensor units 106 may be identified and analyzed, to realize the fingerprint identification.

The fingerprint identification method according to the embodiment of the present disclosure determines the fingerprint identification area according to the coordinate information of the object touching the display panel, to light the corresponding point light source in the backlight module of the display panel according to the fingerprint identification area, collects the fingerprint information after the point light source is lit, and then completes the fingerprint identification according to the fingerprint information. In this way, the fingerprint identification based on the coordinate information of the finger is realized, in which the distance between the surface of the fingerprint and the sensor units (which is a vertical distance D in FIG. 5) is considered, which, as compared with the related art without considering the crosstalk distance between the fingerprints, may reduce the influence of the crosstalk distance on the fingerprint identification, and achieve a good anti-crosstalk effect.

Thereby, this method lights the corresponding point light source according to the fingerprint identification area to realize fingerprint identification, which may reduce the influence of the crosstalk distance on the fingerprint identification.

In an embodiment of the present disclosure, the above step S3 may comprise: determining a position of the fingerprint identification area in the display panel, determining at least one of the plurality of point light sources as the point light source to be lit according to the position of the fingerprint identification area, and lighting the point light source to be lit. This will be explained below with reference to FIGS. 5 and 6.

Figure 6:
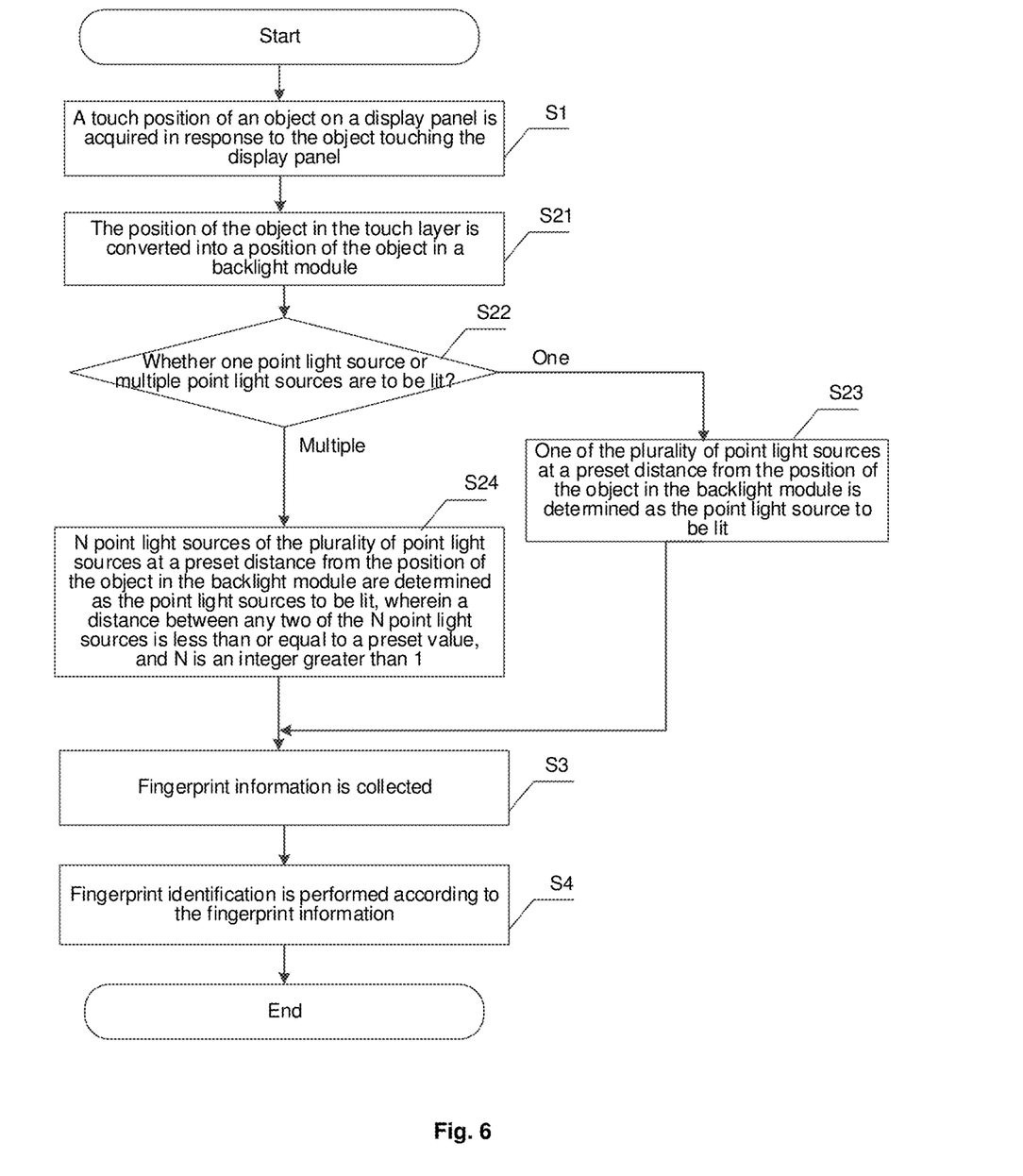
FIG. 6 is a flowchart of a fingerprint identification method according to an example of the present disclosure.

FIG. 6 is a flowchart of a fingerprint identification method according to another embodiment of the present disclosure.

In step S1, a touch position of an object on a display panel is acquired in response to the object touching the display panel.

The touch position of the object (for example, a finger) on the display panel may be a position (x', y') of the finger in a touch layer of the display panel (which is located in the display substrate 104), wherein the position coordinate (x', y') correspond to a touch sensor in an x' row and a y' column of a touch sensor array of the touch layer.

In step S21, the position of the object in the touch layer is converted into a position of the object in a backlight module.

For example, the position (x', y') of the finger in the touch layer may be converted into a position (x, y) of the object in the backlight module 105, wherein the position coordinate (x, y) represents a point light source EL in an x row and a y column of a point light source array.

In step S22, it is determined whether one point light source or multiple point light sources are to be lit. If one point light source is to be lit, step S23 is executed; otherwise, step S24 is executed. In this step, a criterion may be preset to determine whether to light one point light source or multiple point light sources, for example, it may be predetermined to light one point light source or light multiple point light sources. In some embodiments, a number of point light sources to be lit may be determined according to a touch condition of the finger. For example, the larger the touch area of the finger, the more point light sources are to be lit. In some embodiments, a position of the point light source to be lit may also be determined according to the touch condition of the finger, for example, when the finger touches a right edge of the display panel, it may be determined that a point light source to the left of the touch position of the finger is to be lit, which will not be repeated here.

In step S23, one of the plurality of point light sources at a preset distance from the position of the object in the backlight module is determined as the point light source to be lit, and then the procedure proceeds to step S3. For example, assuming that the preset distance is n, in a case of the position coordinate (x, y) of the finger in the backlight module, a point light source at a coordinate (x, (y+n)), (x, (y−n)), ((x−n), y) or ((x+n), y) may be used as the point light source to be lit.

In step S24, N point light sources of the plurality of point light sources at a preset distance from the position of the object in the backlight module are determined as the point light sources to be lit, wherein a distance between any two of the N point light sources is less than or equal to a preset value, and N is an integer greater than 1, and then the procedure proceeds to step S3. For example, assuming that N=3, the preset distance is n point light sources in a column direction from the coordinate point (x, y), and the distance between any two point light sources to be lit in a row direction is required to be less than or equal to one point light source, in a case of the position coordinate (x, y) of the finger in the backlight module, three point light sources at coordinates (x−1, (y+n)), (x, (y+n)) and (x+1, (y+n)) (that is, three point light sources located in the same row and having a distance therebetween equal to or less than one) may be used as the point light sources to be lit respectively. By constraining the distance between the point light sources to be lit, the lit point light sources may be caused to emit light from one side of the finger to avoid the mutual influence of reflected light due to the light being emitted from opposite sides of the finger.

In step S3, fingerprint information is collected from the display panel.

In step S4, fingerprint identification is performed according to the fingerprint information.

In the embodiment of the present disclosure, when the fingerprint identification area is determined in the backlight module, it may be determined whether there is one fingerprint identification area, and if so, a position of the fingerprint identification area (for example, a front side, a rear side, a left side, or a right side of the touch position) is acquired, then a point light source in the backlight module to be lit is determined (for example, a third point light source on the left side of the touch position of the finger is determined as the point light source to be lit) according to the position of the fingerprint identification area, and the point light source to be lit is lit.

Figure 5:
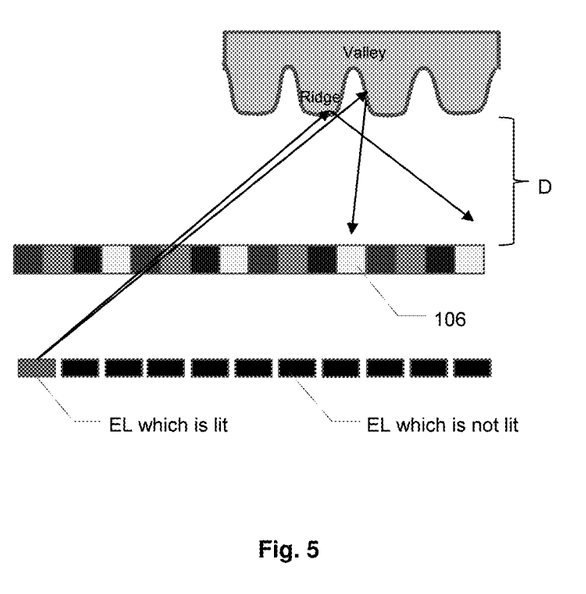
FIG. 5 is a schematic principle diagram of fingerprint collection according to an embodiment of the present disclosure.

For example, as shown in FIG. 5, there is one fingerprint identification area, and the fingerprint identification area is a lower left area with respect to the fingerprint, and then one point light source EL in the backlight module on a lower left side of the finger at a preset distance from the finger is determined as the point light source to be lit. After the point light source EL is lit, light emitted by the point light source EL is incident on ridges and valleys of the fingerprint, and the ridges of the fingerprint cause the light to be reflected at a large angle; and since the valleys of the fingerprint have concave surfaces, when the incident light illuminates the valleys of the fingerprint, most of the light is reflected to corresponding sensor units 106 in an area directly below the finger, so as to realize a fingerprint collection function of sensor units at a large distance (for example, 1.8 mm) from the finger.

In the embodiment of the present disclosure, if there are multiple fingerprint identification areas, a position of each fingerprint identification area is acquired, a point light source to be lit in the backlight module is determined according to each position, and point light sources which need to be lit are lit, wherein the point light sources to be lit are one or more of point light sources on one side of the finger, and are not within a preset distance from the finger on opposite sides of the finger.

In the embodiment of the present disclosure, if it is determined that there are multiple fingerprint identification areas in the backlight module, a position of a normal of each fingerprint identification area is acquired, then a point light source to be lit is determined according to a position of each normal, and the point light source is lit. It should be understood that if it is determined that there is neither one nor more fingerprint identification areas, it means that no fingerprint identification area is determined or the process of determining the fingerprint identification area is wrong, and the procedure may return to determine the fingerprint identification area according to the coordinate information, or return to make a determination again until a number of fingerprint identification areas is determined.

In an example of the present disclosure, it may be determined whether there is one fingerprint identification area, and if so, a position of a normal of the fingerprint identification area (which is a dotted line perpendicular to the fingerprint identification area) is acquired, then a point light source in the backlight module to be lit is determined according to the position of the normal, and the point light source to be lit is lit; and if not, it is determined whether there are multiple fingerprint identification areas, and if so, a position of a normal of each fingerprint identification area is acquired, then a point light source to be lit is determined according to a position of each normal, and the point light source is lit.

In an example of the present disclosure, a distance between the point light source to be lit and the position of the finger in the display module (for example, a value of n described above) is determined according to a thickness of the backlight module and distances between the respective point light sources in the backlight module (distances in x and y directions).

For example, the distance between the point light source to be lit and the position of the finger in the display module is determined according to the thickness of the backlight module and the distances between the respective point light sources in the backlight module, and then a coordinate of the point light source to be lit is determined according to the distance to complete the positioning of the point light source to be lit, so as to light the point light source to be lit, and perform subsequent collection of fingerprint information.

Figure 7A:
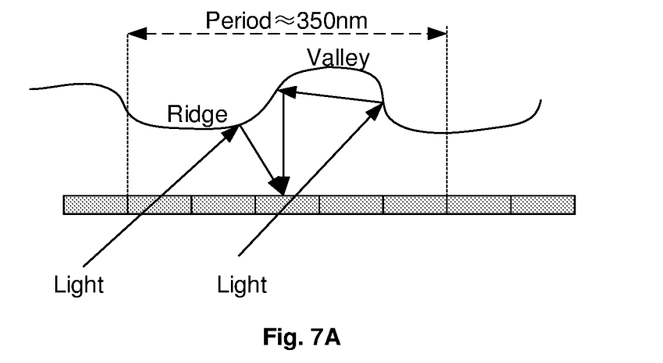
FIG. 7A is a schematic diagram of light which is incident on and is reflected from ridges and valleys of a fingerprint in the related art.

It should be illustrated that in the related art, the main cause of the crosstalk problem of the fingerprint identification is that as shown in FIG. 7A, when light is incident on the finger, a part of the light may be reflected by the finger to the sensor units 106, the less the distances between the sensor units 106 and the fingerprint, the more obvious the difference between the fingerprint information generated at the positions of the sensor units 106, but as the distances (the distances between the sensor units and the fingerprint) increase, the light reflected by the valleys and the ridges is mixed together, which causes the difference between the fingerprint information collected by the sensor units to decrease (that is, the fingerprint information is submerged), and when the sensor units are located at such a distance from the fingerprint that the sensor units below the fingerprint receive the reflected light from the valleys and the ridges at the same time, the sensor units in a corresponding area below the fingerprint are illuminated by light in all directions of the fingerprint, which results in that the fingerprint information is submerged, thus greatly affecting the accuracy of the fingerprint identification.

Figure 7B:
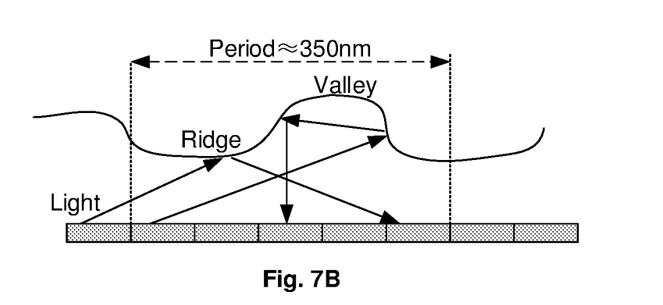
FIG. 7B is a schematic diagram of light which is incident on and is reflected from ridges and valleys of a fingerprint according to an example of the present disclosure.

However, as shown in FIG. 7B, also for a fingerprint period of 350 nm, when the fingerprint method according to the embodiment of the present disclosure is used, an angle at which light is incident on the finger increases as compared to FIG. 7A, light with most energy is reflected at a large angle at positions of the ridges of the fingerprint, which causes the sensor units directly below the fingerprint not to receive the reflected light, and light reflected by the valleys reaches the sensor units below the finger, thereby increasing the identification crosstalk distance. Here, the light incident on the fingerprint is a side incident light. In order to prevent the sensor units far away from the point light source from being affected by light which is reflected at a large angle at a near end of the point light source and light reflected by the valleys, the sensor units at a distance from the point light source which exceeds the preset distance may not operate, and only fingerprint information at the near end of the point light source is collected.

It may be seen that when the fingerprint identification is performed using the fingerprint identification method according to the embodiment of the present disclosure, light may be caused to be incident on the fingerprint at a larger angle, thereby realizing fingerprint collection at a large distance (the distance between the fingerprint and the sensor unit), and point light sources on one side of the fingerprint, instead of point light sources directly below the fingerprint, are lit, to achieve more reliable and accurate fingerprint identification.

Figure 8:
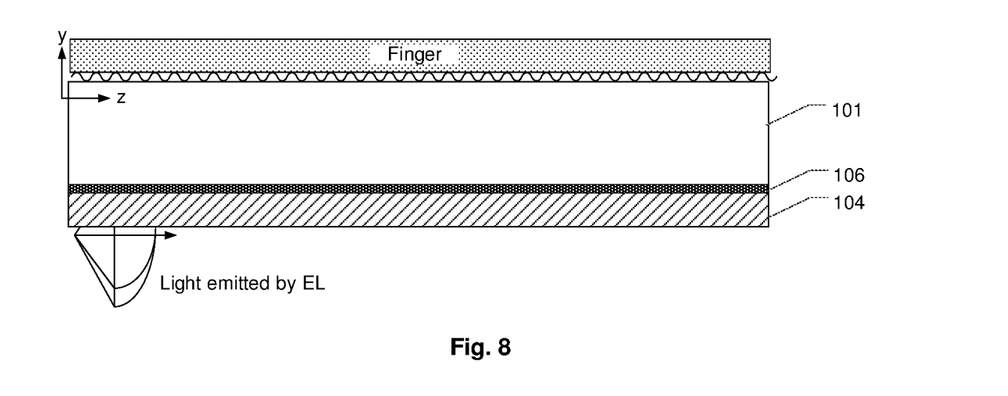
FIG. 8 is a schematic simulation diagram of fingerprint identification according to an embodiment of the present disclosure.
Figure 9A:
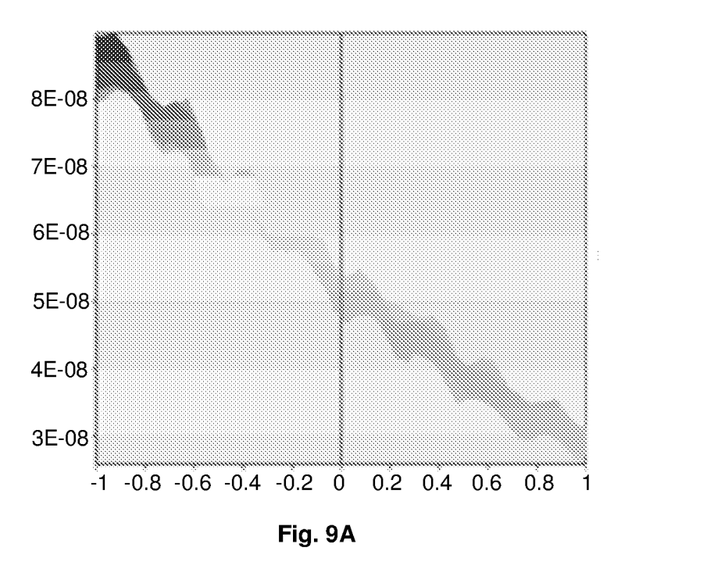
FIG. 9A is a simulated illuminance diagram obtained by performing fingerprint identification using a schematic simulation diagram of fingerprint identification according to an embodiment of the present disclosure.
Figure 9B:
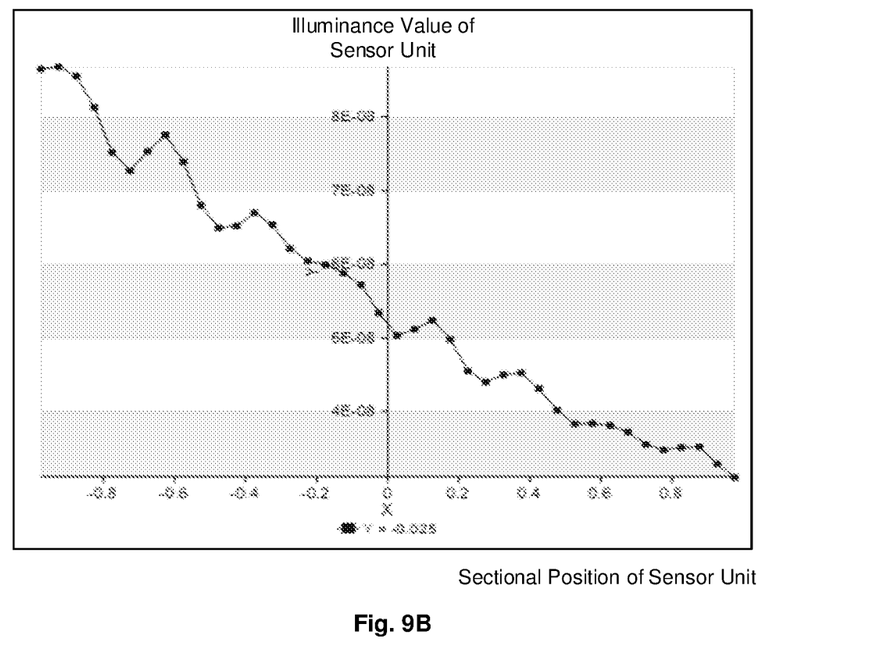
FIG. 9B is a sectional view obtained by performing fingerprint identification using a schematic simulation diagram of fingerprint identification according to an embodiment of the present disclosure.

FIG. 8 is a simulation diagram of fingerprint identification realized by oblique incident light according to an embodiment of the present disclosure, in which a cover 101 is a glass cover with a thickness of 1.5 mm, which may realize reading of fingerprint information. According to the simulation diagram, the fingerprint identification may be simulated to obtain a fingerprint illuminance diagram shown in FIG. 9A and a sectional view shown in FIG. 9B. Valleys of the fingerprint and ridges of the fingerprint may be compared and analyzed according to FIGS. 9A and 9B, and then the fingerprint identification may be realized.

In summary, with the fingerprint identification method according to the embodiment of the present disclosure, corresponding point light sources are lit according to the fingerprint identification area to realize full-screen fingerprint identification, which may reduce the influence of the crosstalk distance on the fingerprint identification, have high reliability and accuracy, and may be applied in display fields such as LCDs, Organic Light Emitting Diodes (OLEDs), Mini-LEDs or Micro-LEDs etc.

Further, the embodiments of the present disclosure propose a computer-readable storage medium having stored thereon a computer program which, when executed by a processor, implements the fingerprint identification method according to the embodiments of the present disclosure described above.

With the computer-readable storage medium according to the embodiment of the present disclosure, when the computer program stored on the computer-readable storage medium is executed by the processor, may light the corresponding point light sources according to the fingerprint identification area to realize full-screen fingerprint identification, which reduces the influence of the crosstalk distance on the fingerprint identification.

Figure 10:
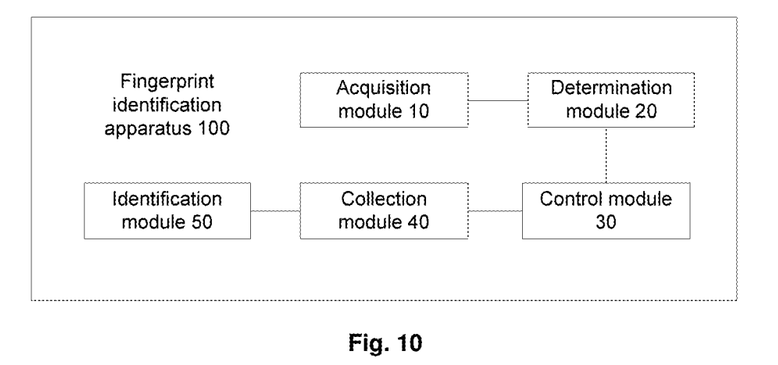
FIG. 10 is a structural block diagram of a fingerprint identification apparatus according to an embodiment of the present disclosure.

Based on the same inventive concept, the embodiments of the present disclosure propose a fingerprint identification apparatus. FIG. 10 is a structural block diagram of a fingerprint identification apparatus according to an embodiment of the present disclosure.

As shown in FIG. 10, the apparatus 100 comprises an acquisition module 10, a determination module 20, a control module 30, a collection module 40, and an identification module 50.

Here, the acquisition module 10 is used to acquire coordinate information of an object when the object touches a full screen; the determination module 20 is used to determine a fingerprint identification area according to the coordinate information; the control module 30 is used to light corresponding point light sources in a backlight module of the full screen according to the fingerprint identification area; the collection module 40 is used to collect fingerprint information after the point light sources are lit; and the identification module 50 is used to perform fingerprint identification according to the fingerprint information.

For example, in practical applications, when an object touches the full screen, firstly, coordinate information of the object is acquired by the acquisition module 10 and is transmitted to the determination module 20, then a fingerprint identification area is determined by the determination module 20 according to the coordinate information and is transmitted to the control module 30, then corresponding point light sources in the backlight module of the full screen are lit by the control module 30 according to the fingerprint identification area, and after the point light sources are lit, fingerprint information is collected by the collection module 40 and is transmitted to the identification module 50, and fingerprint identification is performed by the identification module 50 according to the fingerprint information, to realize full-screen fingerprint identification.

It may be understood that the acquisition module 10 may be provided in a touch layer, the determination module 20 may comprise the backlight module, and the collection module 40 may comprise sensor units.

In an embodiment of the present disclosure, when there is one fingerprint identification area, the control module 30 may acquire a position of a normal of the fingerprint identification area; determine point light sources in the backlight module which need to be lit according to the position of the normal, and light the point light sources which need to be lit, wherein the point light sources which need to be lit are one or more of point light sources on one side of the normal.

In another embodiment of the present disclosure, when there are multiple fingerprint identification areas, the control module 30 may acquire a position of a normal of each fingerprint identification area, determine point light sources in the backlight module which need to be lit according to a position of each normal, and light the point light sources which need to be lit, wherein the point light sources which need to be lit are one or more of point light sources on one side of each normal, and are not within a preset distance from opposite sides of the same normal.

In an example of the present disclosure, a distance between the point light source to be lit and the normal is determined according to a thickness of the backlight module (the distance between the point light source in the backlight module and an upper surface of the cover) and distances between the respective point light sources in the backlight module.

It should be illustrated that, a specific implementation of the fingerprint identification apparatus according to the embodiment of the present disclosure may be known with reference to the specific implementation of the fingerprint identification method according to the embodiment of the present disclosure described above, and will not be repeated here to avoid redundancy.

The fingerprint identification apparatus according to the embodiment of the present disclosure lights the corresponding point light sources according to the fingerprint identification area to realize the full-screen fingerprint identification, which may reduce the influence of the crosstalk distance on the fingerprint identification.

Figure 11:
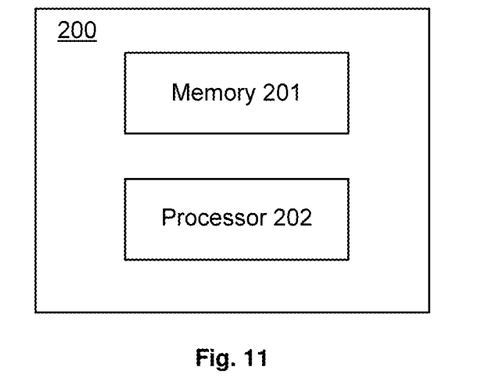
FIG. 11 is a structural block diagram of a fingerprint identification apparatus according to another embodiment of the present disclosure.

FIG. 11 is a structural block diagram of a display apparatus according to another embodiment of the present disclosure. As shown in FIG. 11, the fingerprint identification apparatus 200 may comprise a memory 201 and a processor 202. The memory 201 has stored therein instructions which, when executed by the processor 202, cause the processor 202 to execute the fingerprint identification method according to the embodiment described above.

Figure 12:
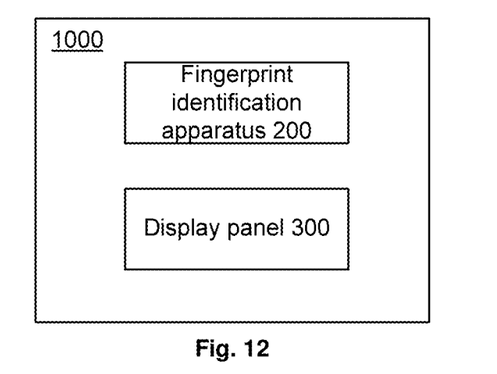
FIG. 12 is a structural block diagram of an electronic device according to an embodiment of the present disclosure.

FIG. 12 is a structural block diagram of an electronic device according to an embodiment of the present disclosure.

As shown in FIG. 12, the electronic device 1000 comprises the fingerprint identification apparatus (for example, the fingerprint identification apparatus 200) according to the embodiment of the present disclosure described above and a display panel 300. The display panel 300 may be the display panel according to any of the above embodiments. The fingerprint identification apparatus 200 may be electrically connected to the display panel 300 to perform fingerprint identification using multiple point light sources and sensor units in the display panel 300.

The electronic device according to the embodiment of the present disclosure uses the fingerprint identification apparatus according to the embodiment of the present disclosure to light the corresponding point light sources according to the fingerprint identification area to realize fingerprint identification, which may reduce the influence of the crosstalk distance on the fingerprint identification.

In the description of the present disclosure, it should be understood that an orientation or position relationship indicated by terms "center", "longitudinal", "transverse", "length", "width", "thickness", "upper", "lower", "front", "rear", "left", "right", "vertical", "horizontal", "top", "bottom", "inside", "outside", "clockwise", "counterclockwise", "axial", "radial", "circumferential" etc. is an orientation or position relationship based on the accompanying drawings, which is only used for the convenience of describing the present disclosure and simplifying the description, rather than indicating or implying that an apparatus or element indicated must have a specific orientation and must be constructed and operate in a specific orientation, and therefore may not be understood as limiting the present disclosure.

In addition, terms "first" and "second" are used for descriptive purposes only, and may not be understood as indicating or implying relative importance or implicitly indicating a number of technical features indicated. Therefore, features defined by "first" and "second" may explicitly or implicitly comprise at least one of the features. In the description of the present disclosure, "a plurality of" means at least two, for example, two, three, etc., unless specifically defined otherwise.

In the present disclosure, terms "installed" "connected with", "connected to" and "fixed" etc. should be understood broadly unless explicitly stated and defined otherwise, for example, there may be fixed or detachable or integrated connections; there may be mechanical or electrical connections; there may be direct connections or indirect connections through an intermediate medium, which may be internal connections in two elements or interaction between two elements, unless specifically defined otherwise. For those of ordinary skill in the art, the specific meanings of the above terms in the present disclosure may be understood according to specific situations.

In the present disclosure, unless explicitly stated and defined otherwise, the statement that a first feature is "on" or "below" a second feature may refer to that the first feature is in direct contact with the second feature, or the first feature is in indirect contact with the second feature through an intermediate medium. Moreover, the statement that the first feature is "on", "above", and "upon" the second feature may refer to that the first feature is directly above or obliquely above the second feature, or only indicates that the first feature is higher in level than the second feature. The statement that the first feature is "below", "beneath", and "under" the second feature may refer to that the first feature is directly below or obliquely below the second feature, or only indicates that the first feature is lower in level than the second feature.

In the description of this specification, the description with reference to the terms "one embodiment", "some embodiments", "examples", "specific examples", or "some examples" etc. means that specific features, structures, materials or characteristics described in conjunction with the embodiments or examples are included in at least one embodiment or example of the present disclosure. In this specification, schematic expressions of the above terms are not necessarily directed to the same embodiment or example. Moreover, the particular features, structures, materials, or characteristics described may be combined in any suitable manner in any one or more embodiments or examples. In addition, those skilled in the art may integrate and combine different embodiments or examples and features of the different embodiments or examples described in this specification without any contradiction.

Although the embodiments of the present disclosure have been shown and described above, it may be understood that the above embodiments are exemplary and should not be construed as limiting the present disclosure. Those of ordinary skill in the art may make changes, modifications, substitutions, and variations to the above embodiments within the scope of the present disclosure.

We claim:

1. A fingerprint identification method, the method comprising:
    acquiring a touch position of an object on a display panel comprising a backlight module having a plurality of light emitting elements arranged into an array, in response to the object on the display panel;
    lighting at least one of the plurality of light emitting elements according to the touch position;
    collecting fingerprint information from the display panel, wherein the fingerprint information is obtained based on light which is emitted by the at least one lit light emitting element and is reflected by the object; and
    performing fingerprint identification according to the fingerprint information,
    wherein the touch position of the object on the display panel is a position of the object in a touch layer of the display panel, and lighting at least one of the plurality of light emitting elements according to the touch position comprises:
    converting the position of the object in the touch layer into a position of the object in the backlight module;
    determining at least one of the plurality of light emitting elements as the light emitting element to be lit according to the position of the object in the backlight module; and
    lighting the light emitting element to be lit;
    wherein determining at least one of the plurality of light emitting elements as the light emitting element to be lit according to the position of the object in the backlight module comprises: determining one or more of the plurality of light emitting elements as a preset distance from the position of the object in the backlight module as the light emitting element to be lit;
    wherein the preset distance depends on a distance between the backlight module and a surface of the display panel touched by the object and distances between respective ones of the plurality of light emitting elements of the backlight module.

2. The fingerprint identification method according to claim 1, wherein determining at least one of the plurality of light emitting elements as the light emitting element to be lit according to the position of the object in the backlight module comprises: determining N light emitting elements of the plurality of light emitting elements at the preset distance from the position of the object in the backlight module as the light emitting elements to be lit, wherein a distance between any two of the N light emitting elements is less than or equal to a preset value, and N is an integer greater than 1.

3. The fingerprint identification apparatus according to claim 1, the preset distance between the light emitting element to be lit and the position of the object in the backlight module is calculated according to the following equation:

$$n = \text{Int}(H/(K*\tan\theta)),$$

where n represents the preset distance by number of light emitting elements, H represents a distance between the backlight module and a surface of the display panel touched by the object P, θ represents a desired angular at which light is emitted from the light emitting element to the object, K represents a distance between two adjacent ones of the plurality of light emitting elements, and Int(x) represent a function for converting a number x into an integer.

4. A non-transitory computer-readable storage medium having stored thereon a computer program which, when executed by a processor, implements the fingerprint identification method according to claim 1.

5. A fingerprint identification apparatus, comprising a memory and a processor, wherein the memory has instructions stored therein, and the processor is configured to execute the instructions to:
acquire a touch position of an object on a display panel comprising a backlight module having a plurality of light emitting elements arranged into an array, in response to the touch on the display panel;
light at least one of the plurality of light emitting elements according to the touch position;
collect fingerprint information from the display panel, wherein the fingerprint information is obtained based on light which is emitted by the at least one lit light emitting element and is reflected by the object; and
perform fingerprint identification according to the fingerprint information,
wherein the touch position of the object on the display panel is a position of the object in a touch layer of the display panel, and the processor is further configured to:
convert the position of the object in the touch layer into a position of the object in the backlight module;
determine at least one of the plurality of light emitting elements as the light emitting element to be lit according to the position of the object in the backlight module; and
light the light emitting element to be lit;
wherein the processor is further configured to: determine one or more of the plurality of light emitting elements at a preset distance from the position of the object in the backlight module as the light emitting element to be lit;
wherein the preset distance depends on a distance between the backlight module and a surface of the display panel touched by the object and distances between respective ones of the plurality of light emitting elements of the backlight module.

6. The fingerprint identification apparatus according to claim 5, wherein the processor is further configured to: determine N light emitting elements of the plurality of light emitting elements at the preset distance from the position of the object in the backlight module as the light emitting elements to be lit, wherein a distance between any two of the N light emitting elements is less than or equal to a preset value, and N is an integer greater than 1.

7. An electronic device, comprising:
a display panel comprising a backlight module having a plurality of light emitting elements provided therein, wherein the plurality of light emitting elements are arranged into an array; and
the fingerprint identification apparatus according to claim 5.

8. The electronic device according to claim 7, wherein the display panel further comprises a plurality of sensor units provided on a light exit side of the backlight module, and are configured to provide fingerprint information based on light which is emitted by the at least one lit light emitting element and is reflected by the object touching the display panel.

9. The electronic device according to claim 8, wherein the display panel further comprises:
a color filter layer having the plurality of sensor units provided therein; and
a display substrate provided between the backlight module and the color filter layer and having a touch layer for providing the touch position of the object provided therein.

10. The electronic device according to claim 9, wherein the display panel further comprises:
a cover provided on one side of the color filter layer away from the backlight module; and
an optical clear adhesive provided between the cover and the color filter layer.

11. The electronic device according to claim 7, wherein the plurality of light emitting elements are mini-Light Emitting Diodes.

12. The electronic device according to claim 7, wherein the plurality of light emitting elements are micro-Light Emitting Diodes.

13. The electronic device according to claim 7, wherein the display panel is a full-screen display panel.

* * * * *